US 6,635,377 B2

(12) United States Patent
Hinokuma

(10) Patent No.: US 6,635,377 B2
(45) Date of Patent: Oct. 21, 2003

(54) ELECTROCHEMICAL DEVICE AND METHOD FOR OPERATION THEREOF

(75) Inventor: Koichiro Hinokuma, Kanagawa (JP)

(73) Assignee: Sony Corporation, Tokyo (JP)

( * ) Notice: Subject to any disclaimer, the term of this patent is extended or adjusted under 35 U.S.C. 154(b) by 60 days.

(21) Appl. No.: 09/932,501

(22) Filed: Aug. 17, 2001

(65) Prior Publication Data

US 2002/0142206 A1 Oct. 3, 2002

(30) Foreign Application Priority Data

Aug. 18, 2000 (JP) .................................... P2000-248034

(51) Int. Cl.$^7$ ............................................... H01M 8/10
(52) U.S. Cl. ............................. 429/33; 429/40; 429/46; 429/13
(58) Field of Search ............................. 429/46, 33, 40, 429/13

(56) References Cited

U.S. PATENT DOCUMENTS

| | | | | |
|---|---|---|---|---|
| 5,277,996 A | * | 1/1994 | Marchetti et al. | ............. 429/44 |
| 5,300,203 A | * | 4/1994 | Smalley | ................ 204/157.41 |
| 6,448,412 B1 | * | 9/2002 | Murphy et al. | ............ 548/417 |

* cited by examiner

*Primary Examiner*—Patrick Ryan
*Assistant Examiner*—Raymond Alejandro
(74) *Attorney, Agent, or Firm*—Bell, Boyd & Lloyd LLC

(57) ABSTRACT

An electrochemical device (or a fuel cell) which comprises a negative electrode, a positive electrode, and a proton conducting portion held between these two electrodes, said proton conducting portion being a fullerenol electrolyte, said negative electrode having a fuel supply port through which methanol and water are fed. The electrochemical device is based on combination of the solid electrolyte and the direct methanol method (in which methanol is directly oxidized with water). It generates a high electric power without cross-over, it achieves improved fuel efficiency, and it permits selection from a broad range of electrode catalysts.

16 Claims, 8 Drawing Sheets $$CH_3OH + H_2O \rightarrow CO_2 + 6H^+ + 6e^-$$

$$2H^+ + 2e^- + \tfrac{1}{2}O_2 \rightarrow H_2O$$

$$CH_3OH + H_2O \rightarrow CO_2 + 6H^+ + 6e^-$$
$$2H^+ + 2e^- + \tfrac{1}{2}O_2 \rightarrow H_2O$$

$C_{60}(OH)_{12}$ $C_{70}$ $C_{60}$

ELECTROCHEMICAL DEVICE AND METHOD FOR OPERATION THEREOF

BACKGROUND OF THE INVENTION

The present invention relates to an electrochemical device and a method for operation thereof.

There are fuel cells that depend on methanol for fuel. Such fuel cells are divided into two categories according to the mode of decomposition of methanol. (See FIG. 2). Those in the first category work in such a way that methanol reacts with water for decomposition into hydrogen gas, and the hydrogen gas is supplied to the negative electrode of the fuel cell. These are referred to as fuel cells of the methanol reforming type. Fuel cells in the second category work in such a way that methanol reacts directly with water on the negative electrode without conversion into hydrogen gas. These are referred to as fuel cells of the direct methanol type.

Fuel cells of the direct methanol type offer the advantage of storing methanol in liquid form. Therefore, it is superior in efficiency and safety to the fuel cell of hydrogen type which stores hydrogen gas. In addition, fuel cells of the direct methanol type can be readily made portable owing to their simpler structure relative to those of the methanol reforming type because they do not need a gas reformer.

Furthermore, in order for fuel cells to be more practicable, it is necessary to reduce their size and simplify their construction. This object is not achieved by those fuel cells which need high temperatures in excess of 200° C. for their operation or which employ a liquid electrolyte. By contrast, it is expected that this object can be achieved by those fuel cells which employ a polymeric solid electrolyte and operate on the basis of the direct methanol method. However, such fuel cells nonetheless have problems as explained below.

A fuel cell of direct methanol type which employs perfluorosulfonic acid resin (such as Nafion (from DuPont) as a polymeric solid electrolyte in membrane form has already been developed. This polymeric solid electrolyte requires the existence of a large amount of water within the polymeric solid electrolyte for proton conduction when the fuel cell operates. Unfortunately, fuel cells of this type have the disadvantage that a large amount of methanol together with water enters the electrolyte membrane from the negative electrode (fuel electrode). This methanol eventually reaches the positive electrode (bringing about cross-over), resulting in a decrease in voltage or output and fuel efficiency.

Another problem is that fuel cells of direct methanol type need a higher catalytic capacity although there are no catalysts meeting this requirement. One practical way of supplementing the catalytic capacity is to heat the operating temperature up to about 150° C. However, heating is not practicable for the polymeric solid electrolyte (such as Nafion) whose operating temperature is limited to 80° C. because of its characteristic properties.

SUMMARY OF THE INVENTION

It is an object of the present invention to provide an electrochemical device and a method for operation thereof. The electrochemical device is applicable to fuel cells employing a solid electrode which works at temperatures of 200° C. or lower in combination with the direct methanol method. The operation of the electrochemical device is intended to increase voltage and output and improve fuel efficiency of the fuel cell without cross-over. Further, the electrochemical device permits selection of an electronic catalyst from a broad range of electrode catalysts.

To achieve the above object, according to an aspect of the present invention, an electrochemical device is provided including: a first electrode, a second electrode, and a proton conducting material held between the first and second electrodes. A major component of the proton conducting material contains a fullerene derivative having proton-dissociating groups introduced into the carbon atoms of fullerene. The term "proton-dissociating group" means functional groups capable of dissociation into proton ($H^+$) by electrolytic dissociation. (The same shall apply hereinafter). The first electrode permits reaction between methanol and water for proton generation.

The present invention further provides a method of operating an electrochemical device having a first electrode, a second electrode, and a proton conducting material held between the first and second electrodes, wherein a major component of the proton conducting material is a fullerene derivative having proton-dissociating groups introduced into the carbon atoms of fullerene. The method includes the step of supplying the first electrode with methanol and water to produce a reaction to generate protons.

The electrochemical device according to the present invention is a novel design in which the direct methanol method is ingeniously combined with the above-mentioned fullerene derivative. The electrolyte containing mainly the fullerene derivative exhibits proton conducting ability without resort to water as the transfer medium. This minimizes the amount of water consumed by the reaction with the methanol and permits the electrolyte to be compactly formed. Thus, only an extremely small amount of aqueous solution of methanol moving toward the positive electrode exists.

A consequence of the foregoing is the substantial absence of cross-over, increased voltage and output, and improved fuel efficiency. In addition, the above-mentioned electrolyte permits the fuel cell to operate at 150° C. or above. This permits selection from a broad range of catalysts or the improvement of existing catalysts in their catalytic capacity.

DETAILED DESCRIPTION OF THE INVENTION

The invention will be described in more detail with reference to the preferred embodiments.

Figure 8B:
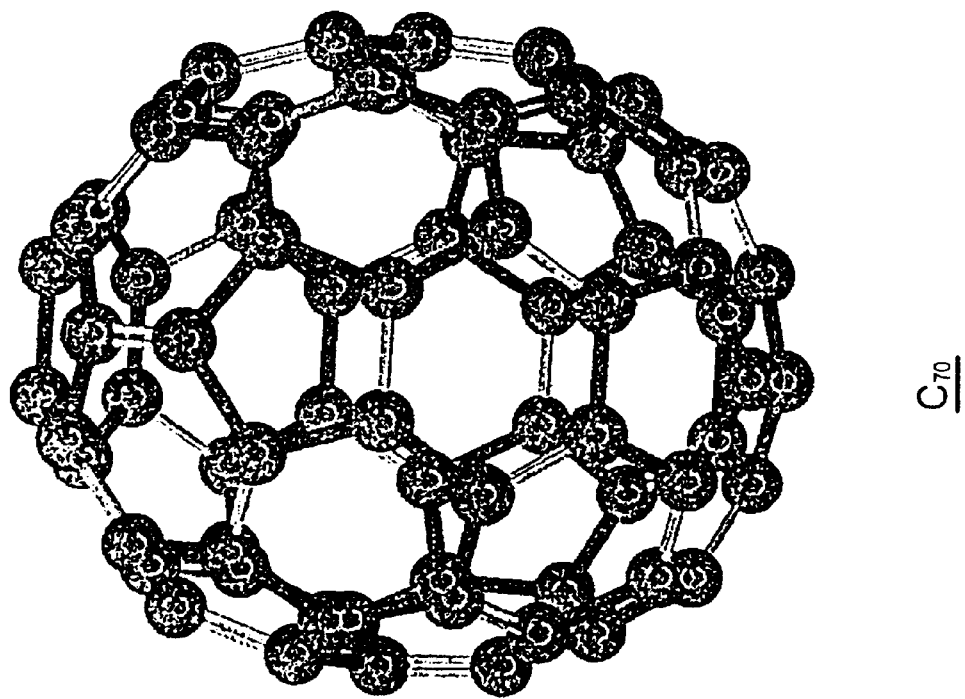
FIGS. 8A and 8B are diagrams showing the structure of a fullerene molecule as the base of the fullerene derivative used in the present invention.
Figure 8A:
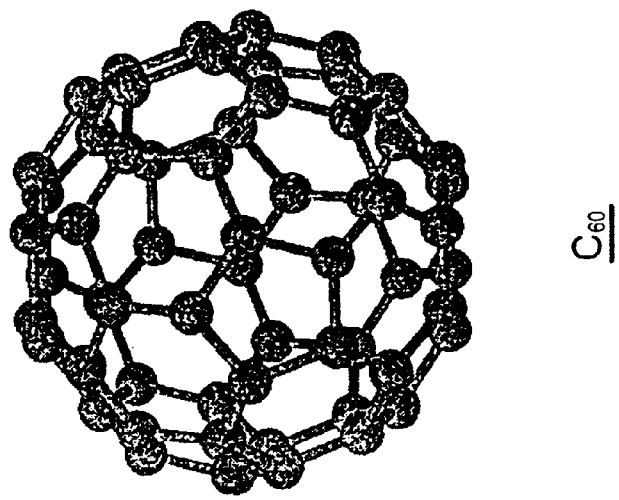

According to the present invention, fullerene functions as a matrix into which proton-dissociating groups are introduced. The fullerene is not specifically restricted so long as it is of a spherical cluster structure. It may be a simple substance or a mixture of two or more simple substances selected from fullerenes represented by $C_{36}$, $C_{60}$ (as shown in FIG. 8A), $C_{70}$ (as shown in FIG. 8B), $C_{76}$, $C_{78}$, $C_{80}$, $C_{82}$, and $C_{84}$.

These fullerene molecules were found in mass spectra of cluster beams resulting from laser abrasion of carbon in 1985. (Kroto, H. W.; Heath, J. R.; O'Brien, S. C.; Curl, R. F.; and Smallery, R. E., Nature 1985, 318, 162) It was five years later that a practical process for their production was established. In 1990, a manufacturing process was found by arc discharge of carbon electrodes. Since then, fullerene has attracted attention as a carbonaceous semiconductor material.

The present inventors extensively studied how the fullerene derivative exhibits its proton conducting characteristics. As the result, it was found that introduction of hydroxyl groups into the carbon atoms constituting fullerene gives rise to fullerene polyhydroxide and that this fullerene polyhydroxide exhibits active proton conductivity, even in its dry state, over a broad range of temperatures (including normal temperature) or over a temperature range from 160° C. to −40° C. at the narrowest, which exceeds the freezing point and boiling point of water. It was also found that the proton conductivity becomes more significant when hydroxyl groups are replaced by hydrogensulfate ester groups.

Figure 6B:
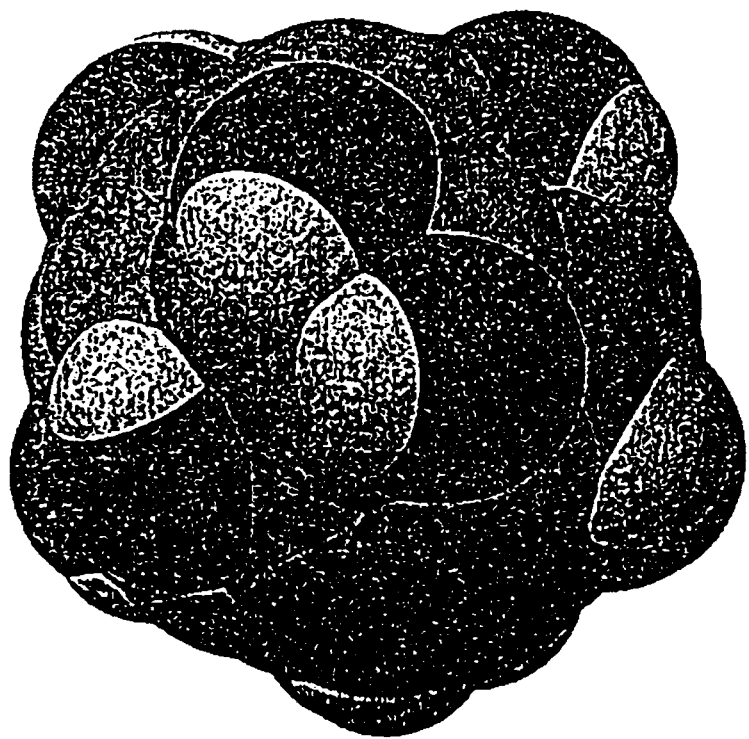
FIGS. 6A and 6B are diagrams showing the structure of fullerene polyhydroxide as an example of the fullerene derivative used in the present invention.
Figure 6A:
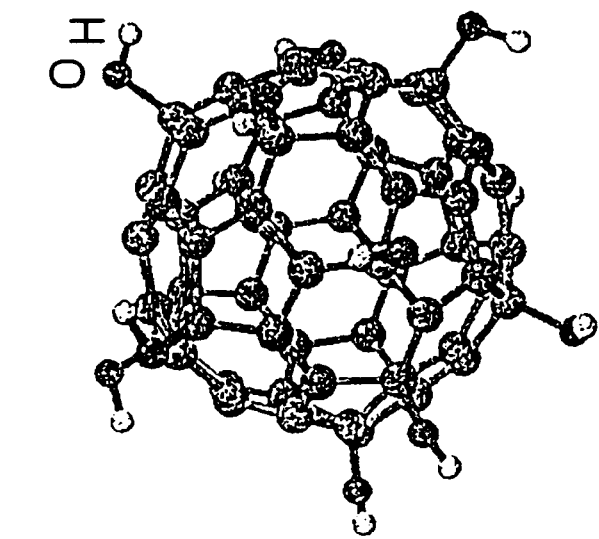

To be more specific, the fullerene polyhydroxide is a generic term given to a compound having the structure composed of fullerene and a plurality of hydroxyl groups as shown in FIG. 6. It is commonly called "fullerenol". As a matter of course, it varies in the number and arrangement of hydroxyl groups in the molecule. The synthesis of fullerenol was reported first by Chiang et al. in 1992. (Chiang, L. Y.; Swirczewski, J. W.; Hsu, C. S.; Chowdhury, S. K.; Cameron, S.; and Creegan, K., J. Chem. Soc, Chem. Commun. 1992, 1791) Since then, fullerenol containing hydroxyl groups more than a certain level has attracted attention because of its water solubility. It has been investigated in the field of biotechnology.

Figure 7A:
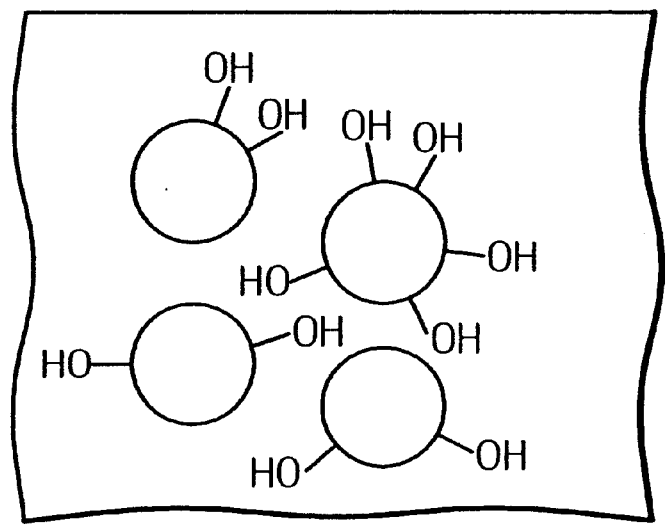
FIGS. 7A and 7B are schematic diagrams showing an example of an aggregate of the fullerene derivative used in the present invention.

The present inventors have made the fullerenol into an aggregate as schematically shown in FIG. 7A. It was found that when neighboring fullerenol molecules are brought close to each other so that hydroxyl groups act on each other, the aggregate behaves as macroscopic aggregates, exhibiting active proton conducting characteristics (which is due to dissociation of $H^+$ from the phenolic hydroxyl group of the fullerenol molecule) In FIG. 7, each circle represents a fullerene molecule.

Figure 7B:
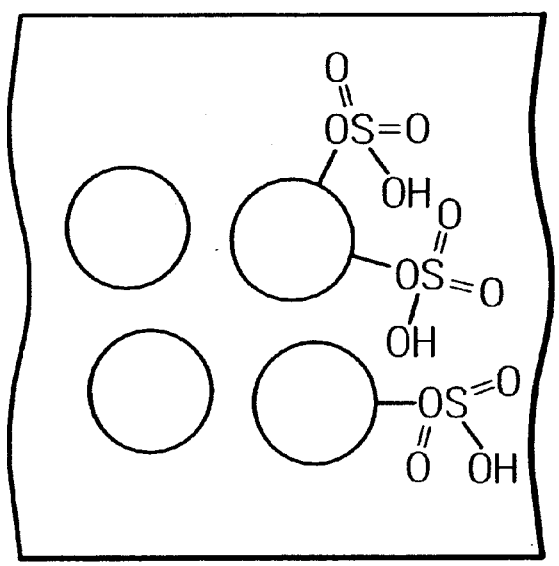

The same phenomenon as mentioned above is also observed when fullerenol as a proton conductor is replaced by an aggregate of fullerene having a plurality of $-OSO_3$. Upon replacement of OH groups with $OSO_3$ groups, fullerene polyhydroxide gives fullerenol hydrogensulfate ester, as shown in FIG. 7B. This was also reported by Chiang et al. in 1994. (Chiang. L. Y.; Wang, L. Y.; Swirczewski, J. W.; Soled, S.; and Cemeron, S., J. Org. Chem. 1994, 59, 3960) The esterified fullerene may have only $OSO_3$ groups in one molecule or may have both $OSO_3$ groups and hydroxyl groups in one molecule.

When an aggregate is formed from a large number of the above-mentioned fullerene derivatives, the resulting aggregate as a bulk exhibits proton conductivity regardless of ambience. In other words, the proton conductivity is concerned directly with the movement of protons derived from a large number of hydroxyl groups and $OSO_3$ groups which are originally present in the molecule. Therefore, there is no need to take in hydrogen originating from water vapor molecules in ambience, and there is no need for water to be supplied from the outside, particularly from the absorption of moisture from the atmospheric air. In addition, fullerene as the base of the derivative has electrophilic properties, and this seems to greatly promote dissociation of hydrogen ion in $OSO_3H$ groups with a high acidity as well as hydroxyl groups. This is one of the reasons why the proton conducting material used in the present invention exhibits good proton conductivity.

Moreover, due to the fact that a considerably large number of hydroxyl groups and $OSO_3H$ groups can be introduced into one fullerene molecule, the proton conducting material contains protons (taking part in conduction) in large numbers per unit volume. This is another reason why the proton conducting material used in the present invention exhibits particularly high conductivity.

The proton conducting material used in the present invention is composed mostly of carbon atoms of fullerene; therefore, it is light in weight, little susceptible to degradation, and free from contaminating materials. Fullerene is considered to be an almost ideal carbonaceous material from resource saving, environmental, and economical viewpoints, the production cost of fullerene is rapidly decreasing.

In addition, the present inventors' investigation revealed that the proton dissociating groups are not limited to the above-mentioned hydroxyl groups and $OSO_3H$ groups. In other words, the dissociating group is represented by —XH, where X may be any atom or atomic group having a divalent bond. The group —X may also be represented by —OH or —YOH, where Y may be any atom or atomic group having a divalent bond. To be specific, preferred proton dissociating groups include —COOH, —SO₃H, and —PO(OH)₂, in addition to —OH and —OSO₃H mentioned above.

According to the present invention, it is possible to introduce into the fullerene molecule as many proton dissociating groups as desired within the number of carbon atoms constituting the fullerene molecule. The number of proton dissociating groups should preferably be five or more but less than half the number of carbon atoms constituting the fullerene so that fullerene has residual electrons necessary for electron attracting capacity.

The fullerene derivative is necessary as a constituent of the proton conducting material in the present invention as mentioned above. It is synthesized by performing acid treatment or hydrolysis on fullerene powder in any know manner, thereby introducing desired proton dissociating groups into carbon atoms constituting fullerene. (A detail of synthesis will be explained later in the example section.)

The resulting fullerene derivative powder may be formed into pellets, thin film, or any other shape by pressing or filtration. Forming the fullerene requires no binder. The formed product consists substantially of fullerene derivative, which is desirable for the proton conducting material to have high proton conductivity and light weight.

The proton conducting material composed mainly of the above-mentioned fullerene derivative according to the present invention may be satisfactorily used for various electrochemical devices, primarily those including a first electrode, a second electrode, and a proton conducting material held between the two electrodes. It may be applied most satisfactorily to fuel cells among various other electrochemical devices.

Figure 2:
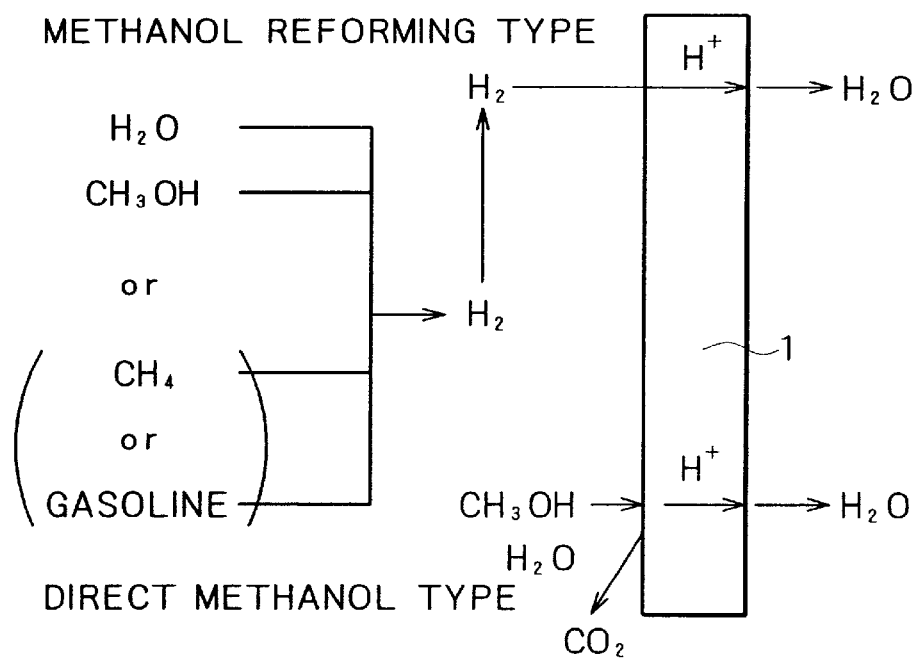
FIG. 2 is a schematic diagram illustrating the structure of the proton conducting portion and the decomposition of methanol as the proton source in the present invention.
Figure 9:
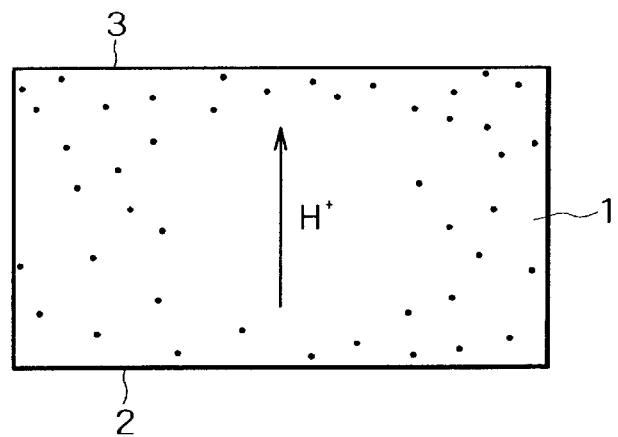
FIG. 9 is a schematic diagram showing the mechanism of proton conduction.

Proton conduction in a fuel cell takes place by the mechanism schematically shown in FIGS. 2 and 9. The proton conducting portion 1 is held between a first electrode 2 (e.g., negative electrode or hydrogen electrode) and a second electrode 3 (e.g., positive electrode or oxygen electrode). Dissociated protons ($H^+$) move from the side of a first electrode to the side of a second electrode in the direction of the arrow.

Figure 1:
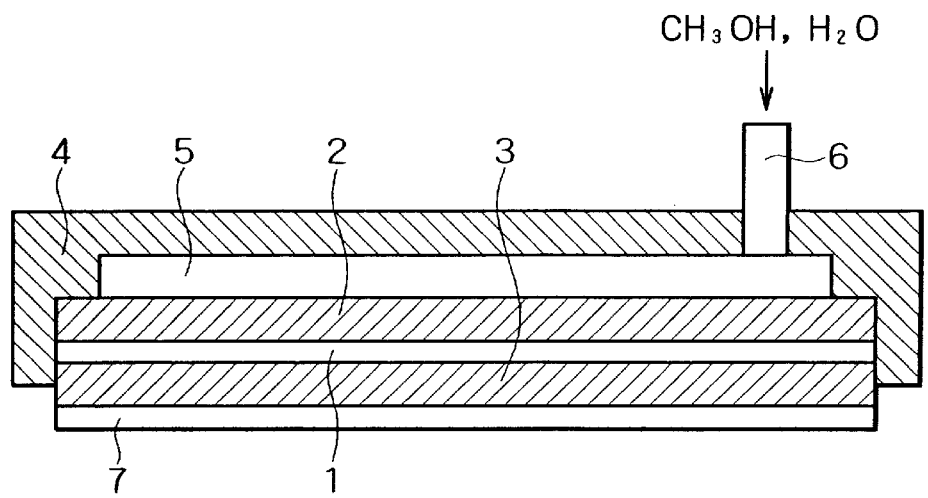
FIG. 1 is a longitudinal cross sectional view showing a fuel cell pertaining to one embodiment of the present invention.

A typical example of fuel cells is shown in FIG. 1. The fuel cell 1 has a negative electrode 2 and a positive electrode 3 which face each other. Each electrode has a catalyst closely attached thereto or dispersed therein. A proton conducting portion 1 is held between these electrodes. A fuel chamber 5 is formed between the negative electrode 2 and the external package 4. An opening connected to a fuel supply port 6 (for methanol and water) is formed at one end of the fuel chamber. When the fuel cell is in action, the negative electrode 2 is supplied with methanol and water through the fuel supply port 6. Reaction products are discharged from an exhaust port (not shown). Some fuel cells lack an exhaust port. While passing through the fuel chamber 5, methanol and water react with each other on the negative electrode 2 to generate protons. The protons thus generated, together with those protons generated by the proton conducting portion 1, move to the positive electrode 3. There they react with oxygen or air on the surface of the positive electrode 3, thereby generating the desired electromotive force.

The fuel cell constructed as mentioned above is characterized by high proton conductivity, because protons are generated by dissociation in the proton conducting portion 1 and because the protons supplied from the negative electrode 2 move to the positive electrode 3. Therefore, the fuel cell needs no humidifying unit, simplifying the structure and reducing the weight of the fuel cell.

The electrochemical device, such as a fuel cell, of the present invention is supplied with methanol and water as fuel. This fuel may be in the form of gas or liquid or a mixture thereof. As shown in FIG. 2 (chemical equation), methanol and water react with each other in the vicinity of the first electrode to form protons, electrons, and carbon dioxide. The protons pass through the proton conducting portion 1, reaching the second electrode, where protons react with oxygen or air to form water.

According to the present invention, the first electrode should preferably be composed of a conducting material carrying a catalyst of the platinum group. The platinum group includes platinum and ruthenium, the former being preferred.

The present invention is best suited for use in fuel cells. It may also be applied to air cells in which at least either of the first and second electrodes is a gas electrode. Moreover, in preferred embodiments, at least either of the first and second electrode should be an electrode formed of an active substance.

Now, the invention will be described with reference to the examples described after the following the detailed description of the process for producing the fullerene derivative, the process forming proton conducting material, and the method for measuring proton conductivity. These processes are not intended to restrict the scope of the invention.

Synthesis of Fullerene Polyhydroxide for Case 1

Synthesis was carried out as follows according to the procedure described in literature (Chiang, L. Y.; Wang, L. Y.; Swirczewski, J. W.; Soled, S.; and Cameron, S., J., Org. Chem. 1994, 59, 3960). Two grams of fullerene mixture (powder) composed of 85% $C_{60}$ and 15% $C_{70}$ was stirred in 30 ml of fuming sulfuric acid under a nitrogen atmosphere at 60° C. for 3 days. The resulting reaction product was gradually added to absolute diethyl ether cooled in an ice bath for precipitation. The precipitates were centrifugally separated and then washed three times with diethyl ether and twice with a 2:1 mixture of diethyl ether and acetonitrile. The washed precipitates were dried at 40° C. under reduced pressure. The dried product was stirred in 60 ml of deionized water with nitrogen bubbling at 85° C. for 10 hours. The precipitates were centrifugally separated and washed several times with pure water, each washing followed by centrifugal dewatering. The washed precipitates were dried at 40° C. under reduced pressure. The resulting brown powder was identified by FT-IR. It gave almost the same IR spectrum of $C_{60}(OH)_{12}$ shown in the above-mentioned literature. Thus it was confirmed that the powder obtained in this manner was the desired fullerene polyhydroxide. The reaction of $C_{60}$ involved in the above-mentioned procedure may be represented by the following chemical equation.

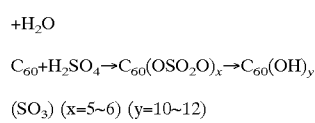

$+H_2O$ $C_{60}+H_2SO_4 \rightarrow C_{60}(OSO_2O)_x \rightarrow C_{60}(OH)_y$ $(SO_3)$ (x=5~6) (y=10~12)

Preparation of Pellets from Aggregate of Fullerene Polyhydroxide for Case 1

Out of the fullerene polyhydroxide powder obtained as mentioned above, 90 mg was pressed in one direction to form a circular pellet, 15 mm in diameter. The pressure applied was about 5 tons/cm². The fullerene polyhydroxide powder readily produced a pellet despite the complete absence of binder resin. The resulting pellet was about 300 μm thick. Such a pellet was used in Case 1.

Synthesis of Hydrogensulfate Ester (Total Ester) of Fullerene Polyhydroxide for Case 2

Synthesis was carried out as follows according to the procedure described in the above-mentioned literature. One gram of fullerene polyhydroxide was stirred in 60 ml of fuming sulfuric acid under a nitrogen atmosphere at room temperature for 3 days. The resulting reaction product was gradually added to absolute diethyl ether cooled in an ice bath for precipitation. The precipitates were centrifugally separated and then washed three times with diethyl ether and twice with a 2:1 mixture of diethyl ether and acetonitrile. The washed precipitates were dried at 40° C. under reduced pressure. The resulting powder was identified by FT-IR. It gave almost the same IR spectrum of totally esterified fullerene polyhydroxide shown in the above-mentioned literature. Thus it was confirmed that the powder obtained in this manner was the desired hydrogensulfate ester of fullerene polyhydroxide. The reaction of $C_{60}(OH)_y$ involved in the above-mentioned procedure may be represented by the following chemical equation.

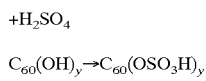

$$C_{60}(OH)_y \rightarrow C_{60}(OSO_3H)_y$$

Preparation of Pellets from Aggregate of Hydrogensulfate Ester of Fullerene Polyhydroxide for Case 2

Out of the hydrogensulfate ester of fullerene polyhydroxide powder obtained as mentioned above, 70 mg was pressed in one direction to form a circular pellet, 15 mm in diameter. The applied pressure was about 5 tons/cm². The hydrogensulfate ester of fullerene polyhydroxide powder readily produced a pellet despite the complete absence of binder resin. The resulting pellet was about 300 µm thick. Such a pellet was used in Case 2.

Synthesis of Hydrogensulfate Ester (Partial Ester) of Fullerene Polyhydroxide for Case 3

Two grams of fullerene mixture (powder) composed of 85% $C_{60}$ and 15% $C_{70}$ was stirred in 30 ml of fuming sulfuric acid under a nitrogen atmosphere at 60° C. for 3 days. The resulting reaction product was gradually added to dehydrated diethyl ether cooled in an ice bath for precipitation. The precipitates were centrifugally separated and then washed three times with diethyl ether and twice with a 2:1 mixture of diethyl ether and acetonitrile. The washed precipitates were dried at 40° C. under reduced pressure. The dried powder product was identified by FT-IR. It gave a spectrum which almost accords with that of fullerene derivative containing partly hydroxyl groups and partly $OSO_3H$ groups. Thus it was confirmed that the powder obtained in this manner was the desired product. The reaction of $C_{60}$ involved in the above-mentioned procedure may be represented by the following chemical equation.

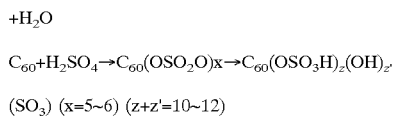

$$C_{60}+H_2SO_4 \rightarrow C_{60}(OSO_2O)x \rightarrow C_{60}(OSO_3H)_z(OH)_{z'}$$

$(SO_3)$ $(x=5\sim6)$ $(z+z'=10\sim12)$

Preparation of Pellets from Aggregate of Hydrogensulfate Ester of Fullerene Polyhydroxide for Case 3

Out of the hydrogensulfate ester (partial ester) of fullerene polyhydroxide powder obtained as mentioned above, 80 mg was pressed in one direction to form a circular pellet, 15 mm in diameter. The applied pressure was about 5 tons/cm². The powder readily produced a pellet despite the complete absence of binder resin. The resulting pellet was about 300 µm thick. Such a pellet was used in Case 3.

Preparation of Pellets from Aggregate of Fullerene for Case 4

Out of the fullerene powder used for the above-mentioned synthesis, 90 mg was pressed in one direction to form a circular pellet, 16 mm in diameter. The pressure was about 5 tons/cm². The fullerene powder readily produced a pellet despite the complete absence of binder resin. The resulting pellet was about 300 m thick. Such a pellet was used in Case 4 (for comparison).

Measurements of Proton Conductivity of Pellets for Cases 1 to 4

The pellets for Cases 1 to 4 were tested for conductivity in the following manner. Each pellet was held between circular aluminum sheets having the same diameter (15 mm) as the pellet. An ac voltage (with an amplitude of 0.1 V) ranging from 7 MHz to 0.01 Hz was applied across the aluminum sheets. The complex impedance at each frequency was measured in a dry atmosphere.

Figure 10A:
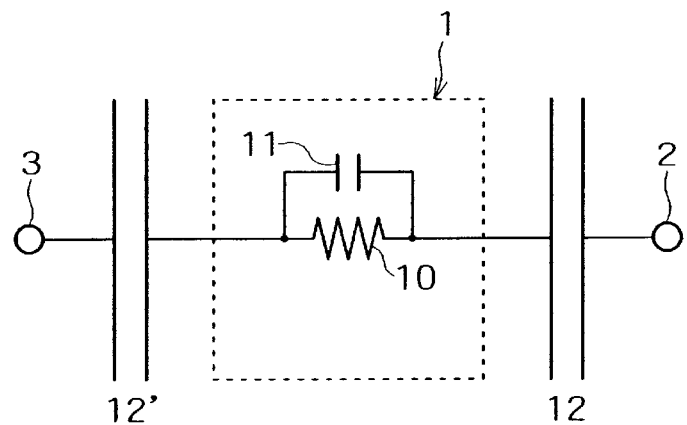
FIGS. 10A and 10B are diagrams showing equivalent circuits of the fullerene derivative and sheer fullerene, both in pellet form.

The assembly used for measuring impedance may be represented by the equivalent circuit shown in FIG. 10A. In the case of pellets for Cases 1 to 3, the proton conducting portion 1 consists of resistance 10 and capacitance 11 arranged in parallel. Additionally, a capacitance 12 is formed between the first electrode 2 and the proton conducting portion 1 and a capacitance 12' is formed between the second electrode 3 and the proton conducting portion 1. The capacitance 11 represents the delay effect (or phase lag at high frequencies) which results from proton movement, and the resistance 10 represents a parameter indicating the ease with which protons move through the conducting portion.

The impedance Z is represented by $Z=Re(Z)+i \cdot Im(Z)$, and indicates the frequency dependence of the proton conducting portion represented by the above-mentioned equivalent circuit.

Figure 10B:
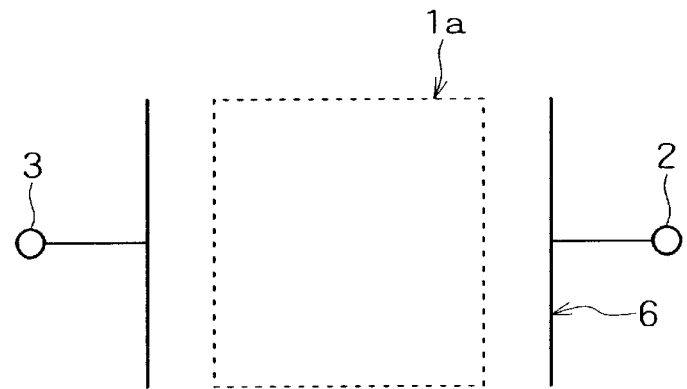

FIG. 10B shows an equivalent circuit of ordinary fullerene molecules without proton-dissociating groups (Case 4) for comparison. The reference numeral 1a in FIG. 10B denotes the fullerene portion.

Figure 11:
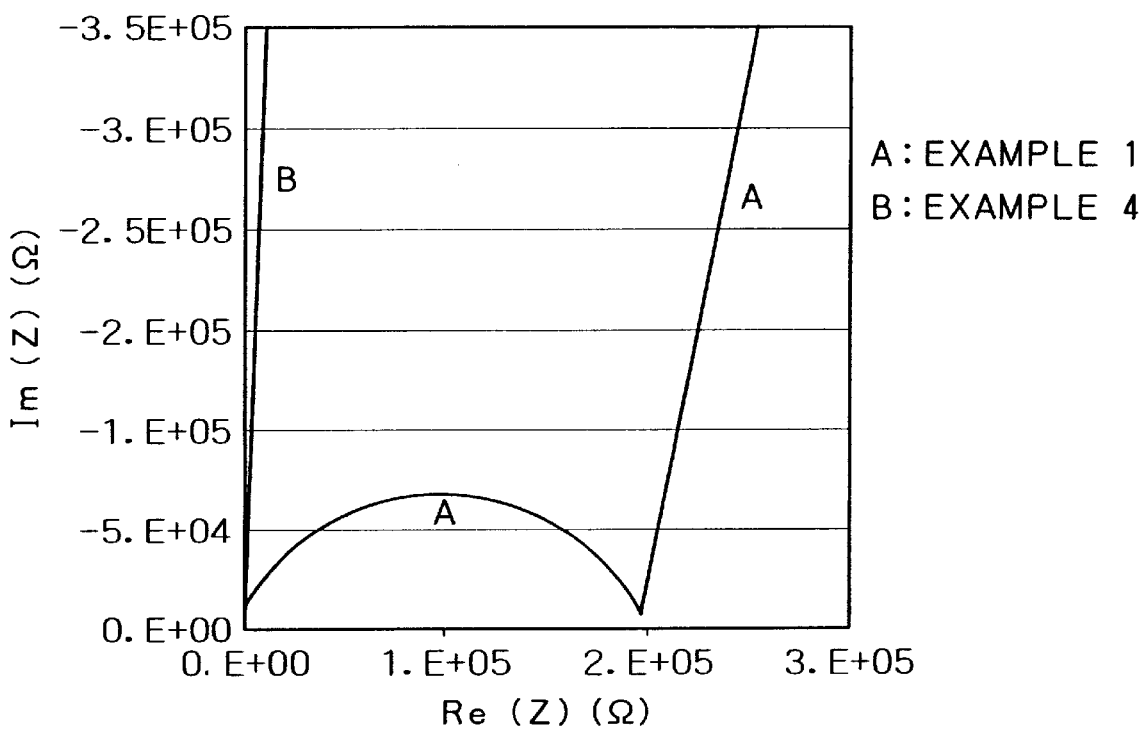
FIG. 11 is a diagram showing the complex impedance of the fullerene derivative and sheer fullerene, both in pellet form.

The pellets in Cases 1 and 4 gave impedance as shown in FIG. 11. The frequency characteristics of the complex impedance in Case 4 (indicated by B) is identical with the behavior of a capacitor alone. In other words, the aggregate of sheer fullerene showed no sign of conduction due to charged particles (such as electrons and ions). By contrast, the frequency characteristics of complex impedance in Case 1 (indicated by A) is a slightly flat semicircular curve in the high-frequency region. This suggests conduction due to charged particles within the pellet. In addition, a steep increase in the imaginary part of impedance is observed in the low-frequency region. This suggests that blocking of charged particles occurs between the pellet and the aluminum electrode as the voltage applied gradually approaches a DC voltage. It is known that charged particles in the pellet are not electrons nor holes but they are ions because charged particles at the side of the aluminum electrode are electrons as a matter of course. The charged particles cannot be anything other than protons in view of the structure of the fullerenol used.

The conductivity of these charged particles can be obtained from the x-axis intercept of the arc in the high-frequency region. The value calculated for the pellet in Case 1 is approximately $5 \times 10^{-6}$ S/cm. Moreover, the same measurements as mentioned above were carried out on pellets in Cases 2 and 3. Their frequency characteristics of impedance were similar to that in Case 1. However, pellets in Cases 1 to 3 differ in conductivity calculated from the x-axis intercept as shown in Table 1.

TABLE 1

Conductivity of pellet as proton conducting material (at 25° C.)

| Designation of pellet | Conductivity (S/cm) |
|---|---|
| Case 1 | $5 \times 10^{-6}$ |
| Case 2 | $9 \times 10^{-4}$ |
| Case 3 | $2 \times 10^{-5}$ |

It is apparent from the foregoing that the conductivity of pellets greatly increases as hydroxyl groups are replaced by $OSO_3H$ groups. This is due to the fact that dissociation of hydrogen takes place more readily in $OSO_3H$ groups than in hydroxyl groups. The above-mentioned phenomenon suggests that the fullerene derivative in aggregate form having hydroxyl groups or $OSO_3H$ groups or both permits proton conduction at room temperature in a dry atmosphere.

Figure 12:
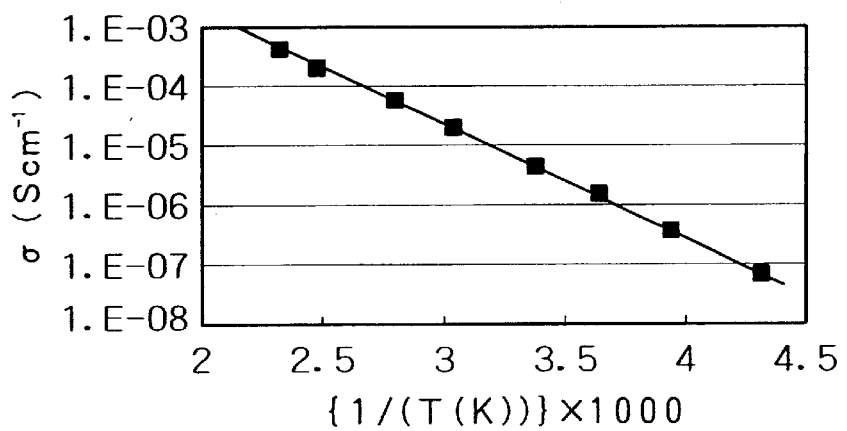
FIG. 12 is a diagram showing the temperature dependence of proton conductivity.

The pellet in Case 1 was tested for complex impedance at temperatures ranging from 160° C. to −40° C. and the temperature dependence of conductivity was obtained from the arc in the high-frequency region. The values obtained were plotted in Arrhenius form as shown in FIG. 12. It is noted that the conductivity changes linearly at temperatures ranging from 160° C. to −40° C. In other words, the graph in FIG. 12 suggests that ionic conduction proceeds by a single mechanism over the above-mentioned temperature range. It is concluded that the proton conducting material composed of fullerene derivative permits proton conduction over a very broad temperature range including room temperature, from 160° C. and to −40° C.

EXAMPLE 1

A fuel cell as shown in FIG. 1 was prepared in the following manner. The catalyst for the positive electrode was formed from carbon powder carrying platinum fine particles. The catalyst for the negative electrode was formed from carbon powder carrying fine particles of platinum and ruthenium mixed in a molar ratio of 1:1.

The proton conducting portion or the fullerenol electrolyte was formed in film form by coating the electrode with a solution of hydrogensulfated fullerenol powder and polyvinylidene fluoride (PVdF) powder (in an amount of 5 wt %) dissolved in normal methyl pyrrolidone (NMP).

The fuel cell prepared in this manner was fed with methanol and water mixed in a molar ratio of 1:1 through the fuel supply port. The fuel cell generated an open-circuit voltage of 0.8 V at room temperature (23° C.). This voltage remained almost unchanged with time. (See FIG. 3) This suggests that cross-over did not occur in the fullerenol electrolyte.

Figure 3:
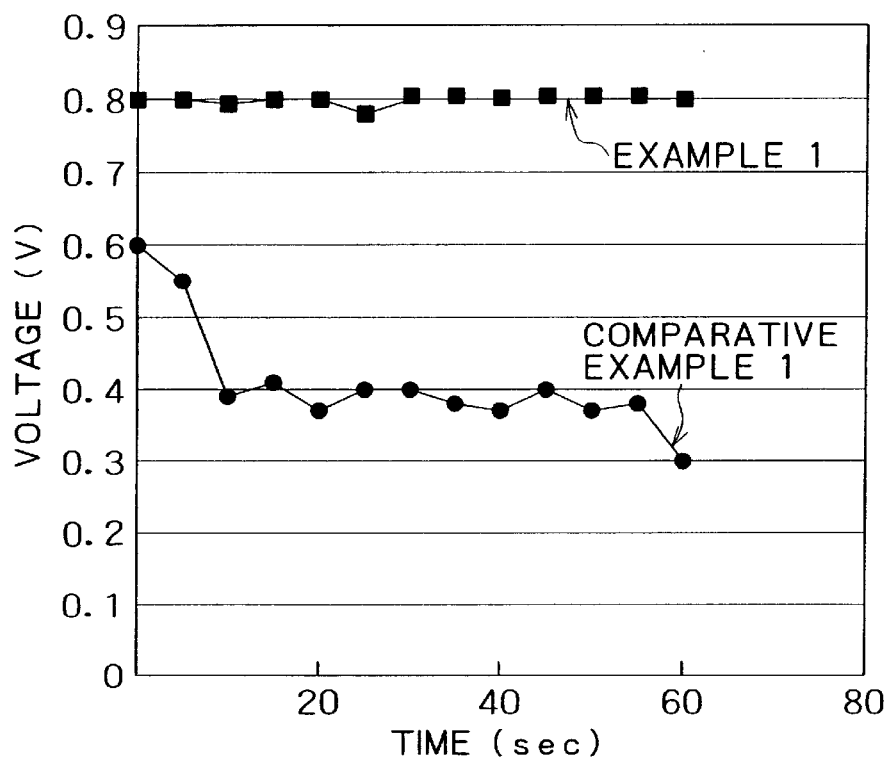
FIG. 3 is a graph showing the relation between generated voltage and time in the fuel cell pertaining to one embodiment of the present invention and in a comparison fuel cell.

In Comparative Example 1, a fuel cell was prepared in which the above-mentioned fullerenol electrolyte is replaced by Nafion 117. The fuel cell instantaneously generated voltage but the voltage rapidly decreased as shown in FIG. 3. When fed with methanol and water (in liquid form) mixed in a molar ratio of 1:5, the fuel cell continued to generate voltage fluctuating with time.

Figure 4:
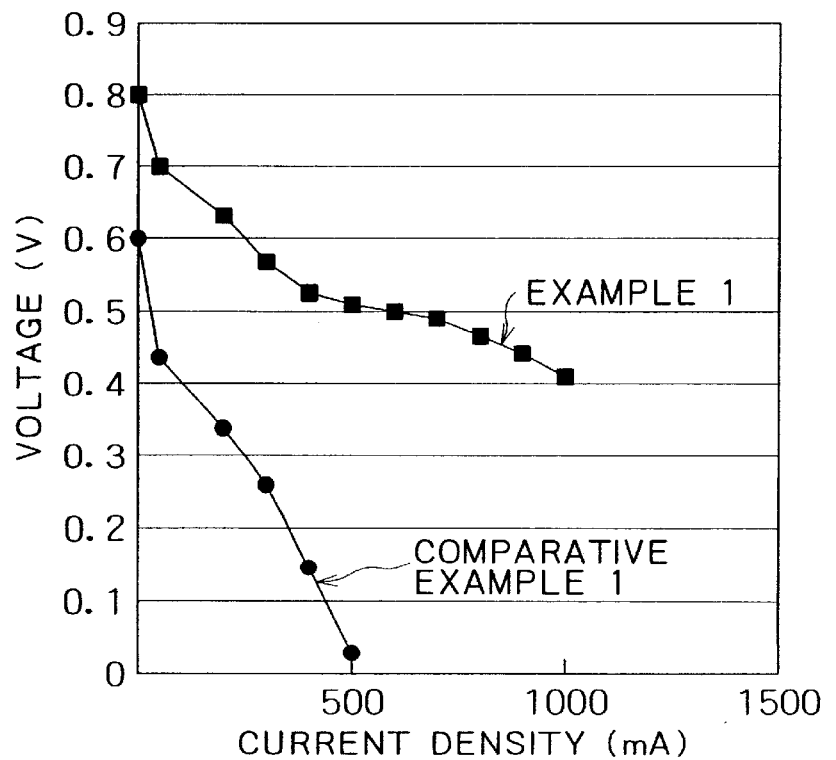
FIG. 4 is a graph showing the relation between generated voltage and current density in the fuel cell pertaining to one embodiment of the present invention and in a comparison fuel cell.

The relation between voltage and current density is shown in FIG. 4. It is apparent that the fuel cell in Example 1 keeps a higher voltage and output over the entire range of current density than the fuel cell in Comparative Example 1.

EXAMPLE 2

Figure 5:
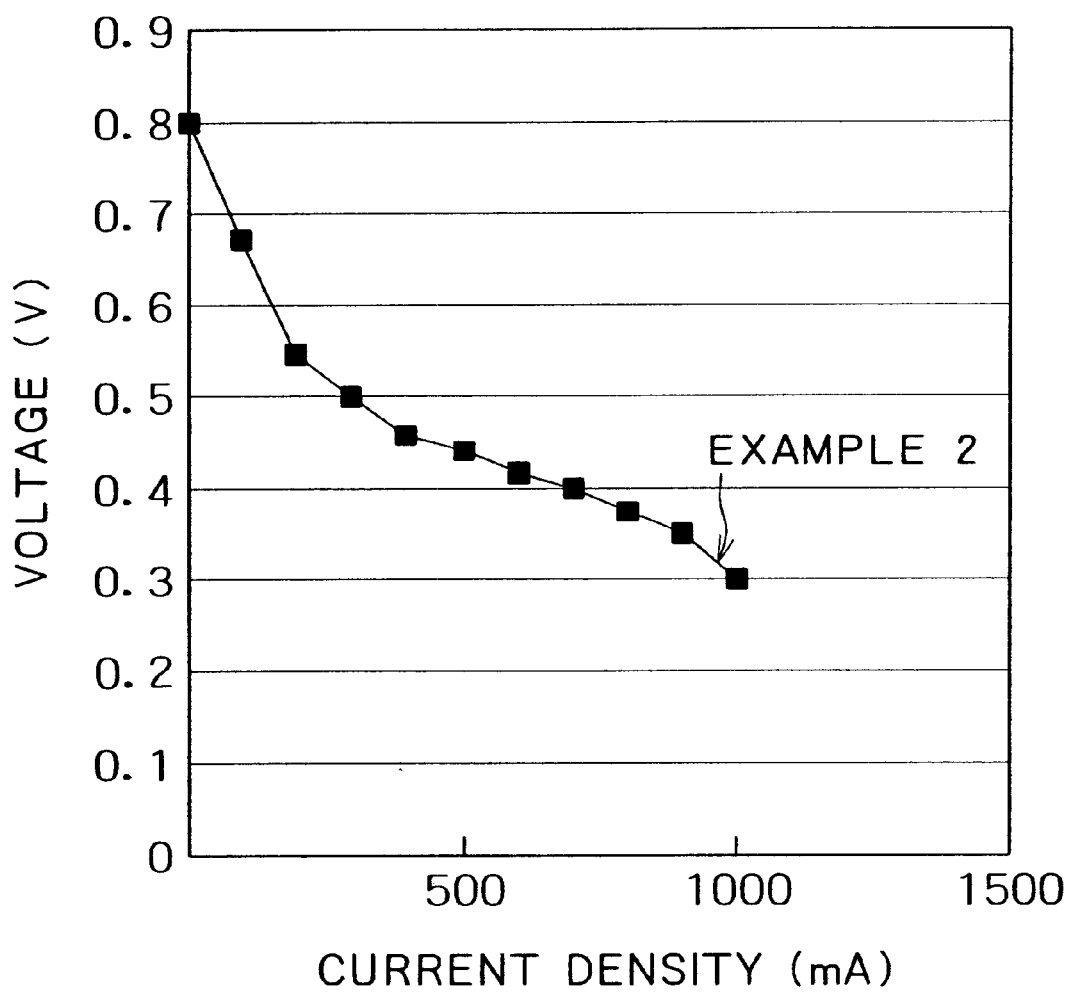
FIG. 5 is a graph showing the relation between voltage and current density obtained by the fuel cell pertaining to another embodiment of the present invention.

The same fuel cell as in Example 1 was prepared except that the material for the negative electrode was switched to fine particles of Pt alone from fine particles of Pt and Ru mixed together. The fuel cell, kept at 150° C., was fed with methanol and water in vapor form mixed in a molar ratio of 1:1 through the fuel supply port. The fuel cell gave the voltage-current relation as shown in FIG. 5.

The fuel cell of direct methanol type which employs a platinum catalyst has the disadvantage that carbon monoxide as an intermediate product is formed by direct oxidation of methanol and this carbon monoxide reduces catalytic activity upon absorption onto the platinum catalyst. (This is not the case in Example 1 in which ruthenium used in combination with platinum converts carbon monoxide into carbon dioxide without deteriorating the catalyst)

Although the fuel cell in this example employs platinum alone as the catalyst, it fairly prevents the platinum catalyst from deterioration by adsorption of carbon monoxide because it can be heated up to 150° C. owing to the fullerenol electrolyte. This is proved by the results shown in FIG. 5.

By contrast, the fuel cell in Comparative Example 1 which employs Nafion 117 as the electrolyte becomes incapable of power generation when heated to 150° C. because the electrolyte membrane cannot retain water under the normal vapor pressure.

As mentioned above, the electrochemical device of the present invention generates protons (and hence generates electricity) by combination of the direct methanol method with the solid electrolyte whose major constituent is the above-mentioned fullerene derivative. Therefore, it generates a high electric power without cross-over, it achieves improved fuel efficiency, and it permits selection from a broad range of electrode catalysts.

While the preferred embodiment of the present invention has been described using the specific terms, such description is for illustrative purposes only, and it is to be understood that changes and variations may be made without departing from the spirit or scope of the following claims.

What is claimed is:

1. An electrochemical device comprising:
a first electrode, a second electrode, and a proton conducting material held between these two electrodes, said proton conducting material containing as a major component a fullerene derivative having proton-dissociating groups introduced into the carbon atoms of fullerene, and said first electrode permitting reaction between methanol and water for proton generation.

2. An electrochemical device as defined in claim 1, wherein the electrochemical device is so constructed as to function as a fuel cell in which said first electrode is provided with a supply port for methanol and water.

3. An electrochemical device as defined in claim 1, wherein said proton-dissociating group is —OH or —YOH (where Y denotes any atom or atomic group having a divalent bond).

4. An electrochemical device as defined in claim 1, wherein said proton-dissociating group is any one group selected from —OH, —$OSO_3H$, —COOH, —$SO_3H$, and —$PO(OH)_2$.

5. An electrochemical device as defined in claim 1, wherein said fullerene is spherical carbon cluster.

6. An electrochemical device as defined in claim 1, wherein said fullerene is spherical carbon cluster represented by Cm (where m=36, 60, 70, 76, 78, 80, 82, 84, 86, 88, 90, 92, 94, 96, 98, 100, 102, 104, 106, 108, 110, 112, 114, 116, 118, and 120).

7. An electrochemical device as defined in claim 1, wherein said first electrode is made of a conducting material carrying a catalyst of platinum group.

8. An electrochemical device as defined in claim 7, wherein said catalyst of platinum group is a catalyst of platinum alone or a catalyst of platinum and ruthenium.

9. A method of operating an electrochemical device having a first electrode, a second electrode, and a proton conducting material held between these two electrodes, said proton conducting material containing as a major component a fullerene derivative having proton-dissociating groups introduced into the carbon atoms of fullerene, said method comprising supplying the first electrode with methanol and water for their reaction to generate protons.

10. A method of operating an electrochemical device as defined in claim 9, wherein said electrochemical device functions as a fuel cell.

11. A method of operating an electrochemical device as defined in claim 9, wherein said proton-dissociating group is —OH or —YOH (where Y denotes any atom or atomic group having a divalent bond).

12. A method of operating an electrochemical device as defined in claim 11, wherein said proton-dissociating group is any one group selected from —OH, —OSO$_3$H, —COOH, —SO$_3$H, and —PO(OH)$_2$.

13. A method of operating an electrochemical device as defined in claim 9, wherein said fullerene is spherical carbon cluster.

14. A method of operating an electrochemical device as defined in claim 9, wherein said fullerene is spherical carbon cluster represented by Cm (where m=36, 60, 70, 76, 78, 80, 82, 84, 86, 88, 90, 92, 94, 96, 98, 100, 102, 104, 106, 108, 110, 112, 114, 116, 118, and 120).

15. A method of operating an electrochemical device as defined in claim 9, wherein said first electrode is made of a conducting material carrying a catalyst of platinum group.

16. A method of operating an electrochemical device as defined in claim 15, wherein said catalyst of platinum group is a catalyst of platinum alone or a catalyst of platinum and ruthenium.

* * * * *